Feb. 17, 1959    J. KOGAN    2,873,800
WINDOW SCREEN FOR AN AUTOMOBILE
Filed April 15, 1958
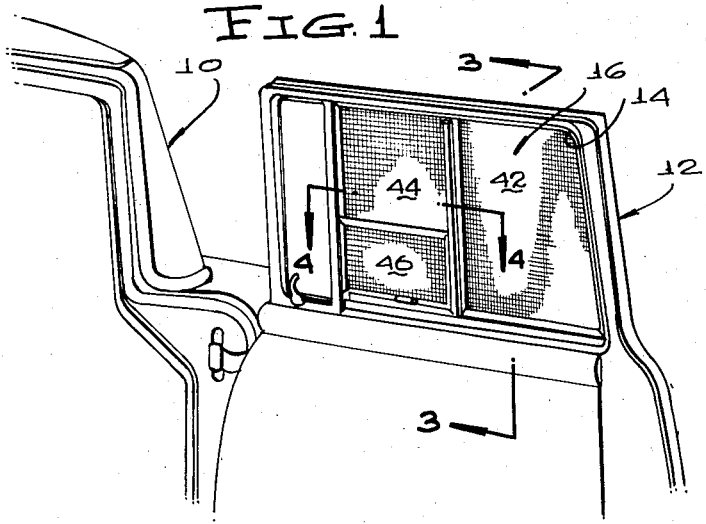
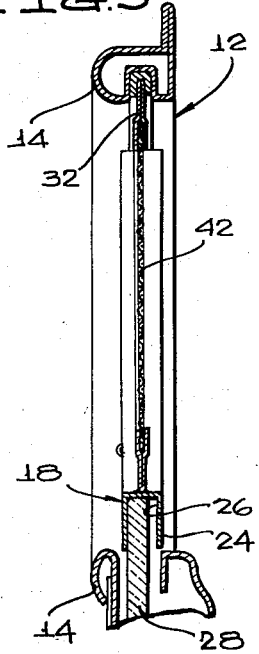
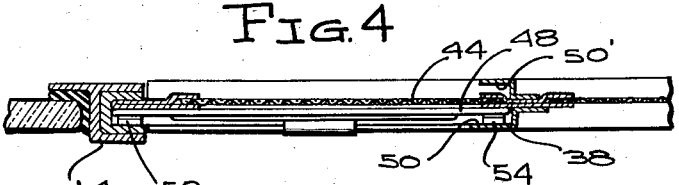
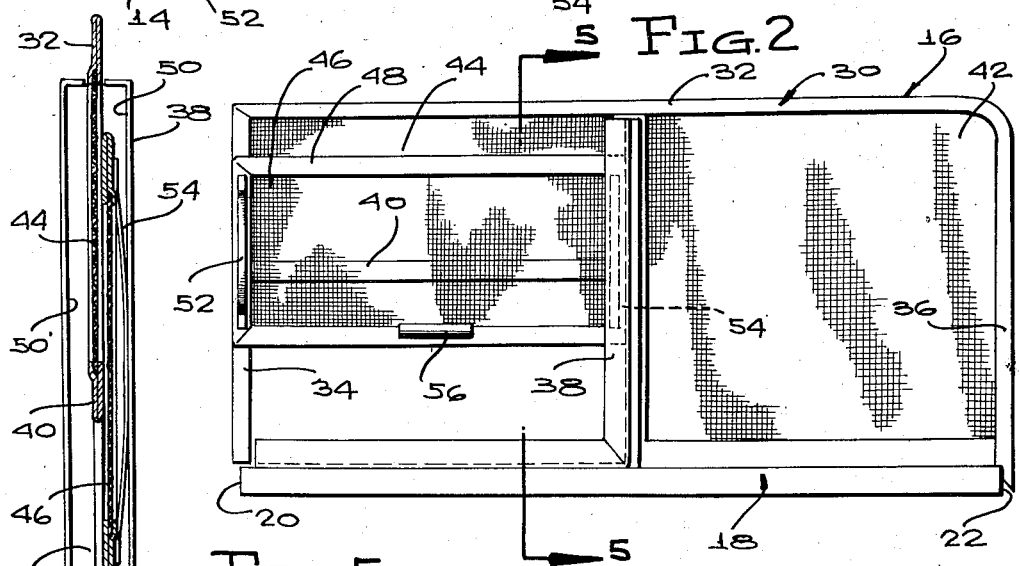
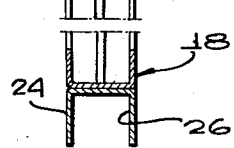
INVENTOR.
JACK KOGAN
BY
McMorrow, Berman + Davidson
ATTORNEYS

United States Patent Office 2,873,800
Patented Feb. 17, 1959

2,873,800

WINDOW SCREEN FOR AN AUTOMOBILE

Jack Kogan, Philadelphia, Pa.

Application April 15, 1958, Serial No. 728,663

2 Claims. (Cl. 160—180)

The present invention relates to window screens for automobiles and in particular to a window screen for inserting in the space in an automobile window frame when the automobile window is lowered.

An object of the present invention is to provide a window screen for an automobile which lends itself to ready insertion into and withdrawal from the opening in a window frame in an automobile window when the window has been lowered, one which may be manufactured to fit all size window frame openings, one which requires no fastening elements for retaining the screen in the window frame opening, and one which is economically feasible.

Another object of the present invention is to provide a window screen for an automobile window frame which is sturdy in construction, one simple in structure, and one which is attractive in appearance when installed in a window frame opening.

These and other objects and advantages of the present invention will be fully apparent from the following description when taken in conjunction with the annexed drawing, in which:

Figure 1 is an isometric view of a portion of an automobile and door with the window screen of the present invention installed in the window frame opening of the door;

Figure 2 is a plan view of the window screen according to the present invention, the sliding portion of the screen being shown in partially opened condition;

Figure 3 is a view on an enlarged scale, taken on the line 3—3 of Figure 1;

Figure 4 is a view on an enlarged scale, taken on the line 4—4 of Figure 1; and

Figure 5 is a view on an enlarged scale, taken on the line 5—5 of Figure 2.

Referring to the drawing in which like numerals indicate like parts throughout the several views, the reference numeral 10 designates an automobile having a door 12 with a window frame 14 in the upper end portion of the door 12. The window screen of the present invention is designated by the reference numeral 16 and is shown, in Figure 1, to be inserted in the opening in the window frame 14.

The screen 16 comprises a base frame member 18 having opposed ends 20 and 22. The base frame member 18 has a bottom 24 formed with an inverted U-shaped groove 26, as shown most clearly in Figure 3. The groove 26 extends inwardly from the bottom 24 and receives the top edge portion of a window pane 28 when the latter is moved to the lowered position within the automobile window frame 14.

A main frame 30 rises from and is supported by the base frame member 18 and includes a top frame piece 32 extending along the entire length of the base frame member 18 and parallel thereto. The main frame 30 includes a first side frame piece 34 extending vertically downwardly from the one end of the top frame piece 32 contiguous with the end 20 of the base frame member 18. A second side frame piece 36 extends vertically downwardly from the end of the top frame piece 32 contiguous with the base frame member end 22.

The lower end of the side piece 36 is fixedly secured to the end 22 of the base frame member 18 while the lower end of the side piece 34 is adjacent to but completely unattached to the end 20 of the base frame member 18, as shown most clearly in Figure 2.

A first partition strip 38 is positioned midway between the side pieces 34 and 36 and rises vertically from and is fixedly secured to the midportion of the top frame piece 32 and the base frame member 18.

A second partition strip 40 is positioned midway between the top frame piece 32 and the base frame member 18 and extends from the midportion of the partition strip 38 to the midportion of the side piece 34. The ends of the partition strip 40 are fixedly secured to the midportions of the partition strip 38 and the frame end piece 34.

The screen 16 of the present invention has a screen sheet assembly consisting of a first screen sheet 42 confined in its margins between the main frame side piece 36, the partition strip 38, and the adjacent parts of the top frame piece 32 and the base frame member 18. The screen sheet assembly includes a second screen sheet 44 confined in its margins between the side piece 34, the partition strip 40, and the adjacent parts of the top frame piece 32 and the partition strip 38. The screen sheet assembly includes a screen panel 46 having a metallic frame 48 extending about its perimeter, the screen panel 46 normally closing the space between the screen side piece 34, the partition strip 40, and the adjacent parts of the partition strip 38 and the base frame member 18.

As shown in Figure 4, the vertically disposed partition strip 38 is formed with a trackway 50 receiving the adjacent part of a frame 48 of the screen panel 46, permitting movement of the screen panel 46 from the position closing the space between the horizontally disposed partition strip 40 on the adjacent parts of the side piece 34, the partition strip 38, and the base frame member 18, to a positioning opening or partially opening such space as shown in Figure 2. It is understood that the opposite edge portion of the panel 46 will ride in the groove provided in the window frame 14 when the screen 16 of the present invention is installed therein. Spring strips 52 and 54 project from the vertical portions of the frame 48 and insure a tight fit of the panel 46 in the trackway 50 and in the adjacent part of the window frame 14 when the screen 16 is installed therein.

An important feature of the present invention resides in the fact that the lower end of the side piece 34 is disconnected from the end 20 of the base frame member 18. This permits the bending of the top frame piece 32 and the bending away of the side piece 34 from the base frame member 18 a sufficient distance to permit the insertion of the side pieces 34 and 36 into the opposed channels of the window frame 14 after the window pane 28 has been lowered into the lower part of the frame 14. After the screen 16 is for the most part within the window frame opening, the base frame member 18 is moved inwardly to a position in which it will receive the top portion of the window pane 28 as the latter is raised, as in Figure 3, a distance sufficient to press upwardly on the screen 16 and to force the top piece 32 into the top channel of the frame 14. As will be seen in Figure 2, the ends 20 and 22 of the base frame member 18 do not extend outwardly as far as the insertable edge portions of the side pieces 34 and 36. Therefore, the base frame member 18 will not extend at its ends into the channels of the window frame 14 but will be saddled upon the window pane 28.

A handle 56 is provided on the lower portion of the frame 48 for manually effecting the movement of the screen panel 46 from the closed position to the open position and return to the closed position as desired.

Preferably, the top frame piece 32 and the side pieces 34 and 36 are fabricated of a bendable sheet metal permitting the flexing of the panels so as to bend the top frame piece 32 to draw the outside edges of the side pieces 34 and 36 inwardly sufficiently to be insertable into the channels on the sides of the window frame 14.

In use, the screen panel 46 is first removed from its position with the one side of the frame 48 inserted in the trackway formed in the partition strip 38. Next, finger pressure is applied to the top frame piece 32 to flex the latter lightly and draw the side pieces 34 and 36 inwardly toward each other, whereupon the side pieces 34 and 36 are in turn inserted in the opposed channels of the window frame 14 followed by insertion of the top frame piece 32 into the top channel of the window frame 14. The insertion of the side pieces 34 and 36 into the opposed channels of the window frame 14 is permitted by the disconnection of the side piece 34 with the end 20 of the base frame member 18. Next, the base frame member 18 is shifted so that the groove 26 is above the top edge of the window pane 28 which has been previously lowered within the window frame 14, and thence the window frame 14 is raised upwardly a distance sufficient to engage in the groove 26 and to force the top frame piece 32 into the channel in the top of the window frame 14. Next, the screen panel 46 is inserted into the trackway 50 in the partition strip 38 and then into the portion of the groove in the window frame 14 adjacent the seated part of the side piece 34. The trackway 50 is of sufficient depth that the screen panel 46 may be inserted into the trackway 50 and then drawn partially out of the trackway 50 so as to engage in the channel of the window frame 14 for support of the screen panel 46 in the trackway 50 and the adjacent part of the channel of the window frame 14.

The panel 46 may then be raised for the purpose of insertion of the operator or passenger's hand through the opening to the exterior of the car for the purpose of paying tolls or signaling to other vehicles as required.

Additionally, the partition strip 38 is formed on the opposite side from the trackway 50 with another trackway 50', permitting insertion of the screen panel 46 on either side of the screen 16. This enables the user thereof to install the screen 16 in either the left or right windows and doors of the automobile, as desired.

What is claimed is:

1. In an automobile screen, a base frame member having opposed ends, said base frame member having a bottom provided with a groove extending inwardly from the bottom and adapted to embracingly receive the top edge portion of a window pane when in the lowered position within the automobile window frame, a main frame rising from and supported by said base frame member, said main frame including a top frame piece extending along the entire length of said base frame member and parallel to said base frame member and a side frame piece extending vertically downwardly from each end of said top frame piece, one of said side frame pieces extending from one end of the top frame piece to one of the ends of said base frame member and having the end adjacent the one end of said base frame member fixedly attached to the one end of said base frame member, the other of the side pieces extending from the other end of the top frame piece to the other of the end of said base frame member and having the end adjacent the other end of said base frame member unattached to the other end of said base frame member, a first partition strip positioned midway between said side pieces and extending from the midportion of said top piece to the midportion of said base frame member and fixedly secured to the midportions of said top piece and base frame member, a second partition strip positioned midway between said top piece and said base frame member and extending from the midportions of said first partition strip and the other of said side pieces and fixedly secured to the midportions of said first partition strip and the other of said side pieces, and a screen sheet confined in its margins between said one side piece, said first partition strip, and adjacent parts of said top piece and base frame member, and between said other side piece, said second partition strip, and adjacent parts of said top piece and said first partition strip to form a screen sheet assembly, the portion of said screen sheet assembly between said other side piece, said second partition piece, and the adjacent part of said piece and the unattached end portion of said other side piece being bendable relative to the portion of said screen assembly between said one side piece, said first partition strip, and the adjacent parts of said top piece and base frame member.

2. An automobile screen comprising a base frame member having opposed ends, said base frame member having a bottom provided with a groove extending inwardly from the bottom and adapted to embracingly receive the top edge portion of a window pane when in the lowered position within the automobile window frame, a main frame rising from and supported by said base frame member, said main frame including a top frame piece extending along the entire length of said base frame member and parallel to said base frame member and a side frame piece extending vertically downwardly from each end of said top frame piece, one of said side frame pieces extending from one end of the top frame piece to one of the ends of said base frame member and having the end adjacent the one end of said base frame member fixedly attached to the one end of said base frame member, the other of the side pieces extending from the other end of the top frame piece to the other of the ends of said base frame member and having the end adjacent the other end of said base frame member unattached to the other end of said base frame member, a first partition strip positioned midway between said side pieces and extending from the midportion of said top piece to the midportion of said base frame member and fixedly secured to the midportions of said top piece and base frame member, a second partition strip positioned midway between said top piece and said base frame member and extending from the midportions of said first partition strip and the other of said side pieces and fixedly secured to the midportions of said first partition strip and the other of said side pieces, a screen sheet confined in its margins between said one side piece, said first partition strip, and adjacent parts of said top piece and base frame member, and between said other side piece, said second partition strip, and adjacent parts of said top piece and said first partition strip to form a screen sheet assembly, the portion of said screen sheet assembly between said other side piece, said second partition piece, and the adjacent part of said piece and the unattached end portion of said other side piece being bendable relative to the portion of said screen assembly between said one side piece, said first partition strip, and the adjacent parts of said top piece and base frame member, and a screen panel closing the space between said other side piece, said second partition strip, and the adjacent parts of said first partition strip and said base frame member and connected to said first partition strip for movement from the closed position to a position opening said space.

No references cited.